(12) United States Patent
Patel

(10) Patent No.: US 10,567,745 B2
(45) Date of Patent: Feb. 18, 2020

(54) HEAD MOUNT DISPLAY WITH AUTOMATIC INTER-PUPILLARY DISTANCE ADJUSTMENT

(71) Applicant: The Void, LLC, Lindon, UT (US)

(72) Inventor: Sajid Patel, Arlington Heights, IL (US)

(73) Assignee: The Void, LLC, Lindon, UT (US)

( * ) Notice: Subject to any disclaimer, the term of this patent is extended or adjusted under 35 U.S.C. 154(b) by 0 days.

(21) Appl. No.: 15/284,851

(22) Filed: Oct. 4, 2016

(65) Prior Publication Data

US 2017/0237977 A1    Aug. 17, 2017

Related U.S. Application Data

(60) Provisional application No. 62/294,900, filed on Feb. 12, 2016.

(51) Int. Cl.
*H04N 13/371* (2018.01)
*H04N 13/344* (2018.01)

(52) U.S. Cl.
CPC ......... *H04N 13/371* (2018.05); *H04N 13/344* (2018.05)

(58) Field of Classification Search
CPC .................. H04N 13/00; G02B 7/12
USPC ..................... 348/7–10, 153, 158
See application file for complete search history.

(56) References Cited

U.S. PATENT DOCUMENTS

| | | | |
|---|---|---|---|
| 5,767,820 A * | 6/1998 | Bassett | G02B 27/017 345/7 |
| 9,025,252 B2 * | 5/2015 | Lewis | G06K 9/00604 359/630 |
| 2002/0171617 A1 | 11/2002 | Fuller | |
| 2008/0106489 A1 | 5/2008 | Brown et al. | |
| 2014/0071539 A1 | 3/2014 | Gao | |
| 2015/0168730 A1 | 6/2015 | Ashkenazi et al. | |
| 2015/0234168 A1 | 8/2015 | Bumgardner et al. | |
| 2018/0003978 A1 | 1/2018 | Benitez et al. | |

* cited by examiner

*Primary Examiner* — Anand S Rao
(74) *Attorney, Agent, or Firm* — Nicholson De Vos Webster & Elliott LLP

(57) ABSTRACT

A head mount display for use with a virtual reality system allows for an automatic adjustment of an inter-lens distance based on a particular user's inter-pupillary distance (IPD). The IPD for the user is measured, for example by taking an image of the user in a controlled environment and calculating the distance between the user's pupils within the image. Once the IPD is known, a desired inter-lens distance for the particular user may be defined based on user IPD. A computing device in communication with a head mount display unit may automatically adjust the inter-lens distance to match the desired inter-lens distance. A user's IPD and desired inter-lens distance may be stored for the user in a user account. As such, whenever the user participates in the virtual reality system, a head mount display used by the user may be configured with the user's desired inter-lens distance.

14 Claims, 9 Drawing Sheets

HEAD MOUNT DISPLAY WITH AUTOMATIC INTER-PUPILLARY DISTANCE ADJUSTMENT

CROSS-REFERENCE TO RELATED APPLICATIONS

This application claims the priority benefit of U.S. Provisional Application Ser. No. 62/294,900, titled "Head Mount Display with Automatic Inter-Pupillary Distance Adjustment," filed Feb. 12, 2016, the disclosures of which are incorporated herein by reference.

BACKGROUND

Virtual reality systems allow a user to explore a virtual space. Some virtual-reality systems require a user to wear a headset through which the user may visually experience the virtual reality environment. The headsets that implement typical virtual reality systems are fixed devices and not adjustable to a user. In some systems, a strap may be adjustable to fit the diameter of the user's head, but no other adjustment on such headsets are typically available. When provided with limited adjustment capability, headsets that provide a virtual reality experience can be cumbersome at best and ineffective and distracting at worst, significantly reducing the enjoyment of the virtual reality experience. What is needed is a headset for a virtual reality system that is adjustable to a particular user.

SUMMARY

A head mount display for use with a virtual reality system allows for an automatic adjustment of an inter-lens distance based on a particular user's inter-pupillary distance (IPD). The IPD for the user is measured, for example by taking an image of the user in a controlled environment and calculating the distance between the user's pupils within the image. Once the IPD is known, a desired inter-lens distance for the particular user may be defined based on user IPD. A computing device in communication with a head mount display unit may automatically adjust the inter-lens distance to match the desired inter-lens distance. A user's IPD and desired inter-lens distance may be stored for the user in a user account. As such, whenever the user participates in the virtual reality system, a head mount display used by the user may be configured with the user's desired inter-lens distance.

In an embodiment, the head mount display may provide visual content as part of a virtual reality experience for a user and automatically adjust an inter-pupillary distance for a user. The head mount display may include a first display, second display, a first display mount connected to the first display, and a second display mount connected to the second display. A gear assembly may be coupled to the first display mount and second display mount. A motor may be coupled to the gear assembly, such that the motor is able to engage the gear assembly to move the first display mount and second display mount closer together or to move the first display mount and second display mount further apart based on the user's inter-pupillary distance. A communication interface may be coupled to the motor, wherein the communication interface able to receive one or more signals that drive the motor.

An embodiment may include a method for adjusting an inter-pupillary distance of a head mount display unit display that provides visual content as part of a virtual reality experience for a user. The method may include identifying an inter-pupillary distance for a user by a computing device. The computing device may be in communication with a head mount display unit worn by the user for use in a virtual reality environment. The current inter-display distance may be identified in the head mount display unit via a positional encoder. A motor in the head mount display unit may be driven to adjust the position of each of two display based on the inter-pupillary distance for the user.

DETAILED DESCRIPTION

A head mount display for use with a virtual reality system allows for an automatic adjustment of an inter-lens distance based on a particular user's inter-pupillary distance (IPD). The IPD for the user is measured, for example by taking an image of the user in a controlled environment and calculating the distance between the user's pupils within the image. Once the IPD is known, a desired inter-lens distance for the particular user may be defined based on user IPD. A computing device in communication with a head mount display unit may automatically adjust the inter-lens distance to match the desired inter-lens distance. A user's IPD and desired inter-lens distance may be stored for the user in a user account. As such, whenever the user participates in the virtual reality system, a head mount display used by the user may be configured with the user's desired inter-lens distance.

Figure 1:
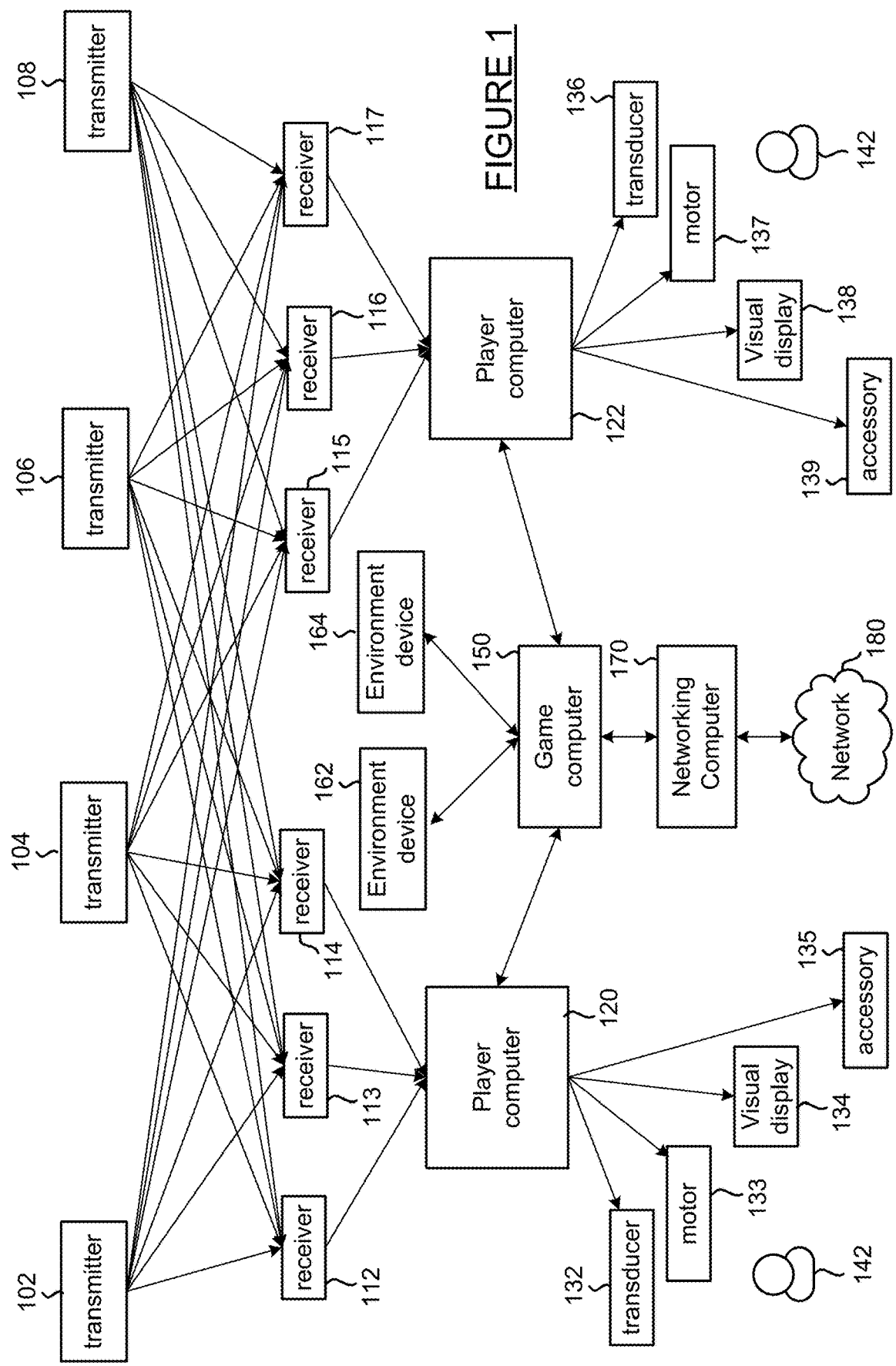
FIG. 1 is a block diagram of a virtual reality system.

FIG. 1 is a block diagram of a virtual reality system with a wideband based position tracking system in which the HMD of the present technology may be used. The system of FIG. 1 includes transmitters 62, 64, 66 and 68, receivers 112, 113, 114, 115, 116 and 117, player computers 120 and 122, transducers 132 and 136, motors 133 and 137, virtual display 134 and 138, accessories 135 and 139, players 140 and 142, game computer 150, environment devices 162 and 164, networking computer 170, and network 180.

Receivers 112-1017 may be placed on a player 140 or an accessory 135. Each receiver may receive one or more signals from one or more of transmitters 62-1008. The signals received from each transmitter may include an identifier to identify the particular transmitter. In some instances, each transmitter may transmit an omnidirectional signal periodically at the same point in time. Each receiver may receive signals from multiple transmitters, and each receiver may then provide signal identification information and timestamp information for each received signal to player computer 120. By determining when each transmitter signal is received from a receiver, player computer 120 may identify the location of each receiver.

Player computer 120 may be positioned on a player, such as for example on the back of a vest worn by a player. For example, with respect to FIG. 11, player computer 250 is positioned on a back of a player 1100. A player computer may receive information from a plurality of receivers, determine the location of each receiver, and then locally update a virtual environment accordingly. Updates to the virtual environment may include a player's point of view in the environment, events that occur in the environment, and video and audio output to provide to a player representing the player's point of view in the environment along with the events that occur in the environment.

Player computer 120 may also communicate changes to the virtual environment determined locally at the computer to other player computers, such as player computer 122, through game computer 150. In particular, a player computer for a first player may detect a change in the player's position based on receivers on the player's body, determine changes to the virtual environment for that player, provide those changes to game computer 150, and game computer 150 will provide those updates to any other player computers for other players in the same virtual reality session, such as a player associated player computer 122.

A player 140 may have multiple receivers on his or her body, as shown in FIG. 11. The receivers receive information from the transmitters and provide that information to the player computer. In some instances, each receiver may provide the data to the player computer wirelessly, such as for example through a radiofrequency signal such as a Bluetooth signal. In some instances, each receive may be paired or otherwise configured to only communicate data with a particular players computer. In some instances, a particular player computer may be configured to only receive data from a particular set of receivers. Based on physical environment events such as a player walking, local virtual events that are provided by the players computer, or remote virtual events triggered by an element of the virtual environment located remotely from the player, haptic feedback may be triggered and sensed by a player. The haptic feedback may be provided in the terms of transducer 132 and motor 133. For example, if an animal or object touches a player at a particular location on the player's body within the virtual environment, a transducer located at that position may be activated to provide a haptic sensation of being touched by that object.

Visual display 134 may be provided through a headset worn by player 140. The virtual display 134 may include a helmet, virtual display, and other elements and components needed to provide a visual and audio output to player 140. In some instances, player computer 120 may generate and provide virtual environment graphics to a player through the virtual display 140.

Accessory 135 may be an element separate from the player, in communication with player computer 120, and displayed within the virtual environment through visual display 134. For example, an accessory may include a gun, a torch, a light saber, a wand, or any other object that can be graphically displayed within the virtual environment and physically engaged or interacted with by player 140. Accessories 135 may be held by a player 140, touched by a player 140, or otherwise engaged in a physical environment and represented within the virtual environment by player computer 120 through visual display 134.

Game computer 150 may communicate with player computers 120 and 122 to receive updated virtual information from the player computers and provide that information to other player computers currently active in the virtual reality session. Game computer 150 may store and execute a virtual reality engine, such as Unity game engine, Leap Motion, Unreal game engine, or another virtual reality engine. Game computer 150 may also provide virtual environment data to networking computer 170 and ultimately to other remote locations through network 180. For example, game computer 150 may communicate over network 22 in the system of FIG. 5 through network 180, which may be separate networks or the same network.

Environment devices 162 may include physical devices part of the physical environment that may interact or be detected by a player 140 or other aspects of the gaming system. For example, and enter environment device 162 may be a source of heat, cold, wind, sound, smell, vibration, or some other sense that may be detected by a player 140.

Transmitters 62-68 may transmit a synchronized wideband signal within a pod to one or more receivers 112-117. Logic on the receiver and on a player computing device, such as player computing device 120 or 122, may enable the location of each receiver to be determined in a universal space within the pod.

Figure 2:
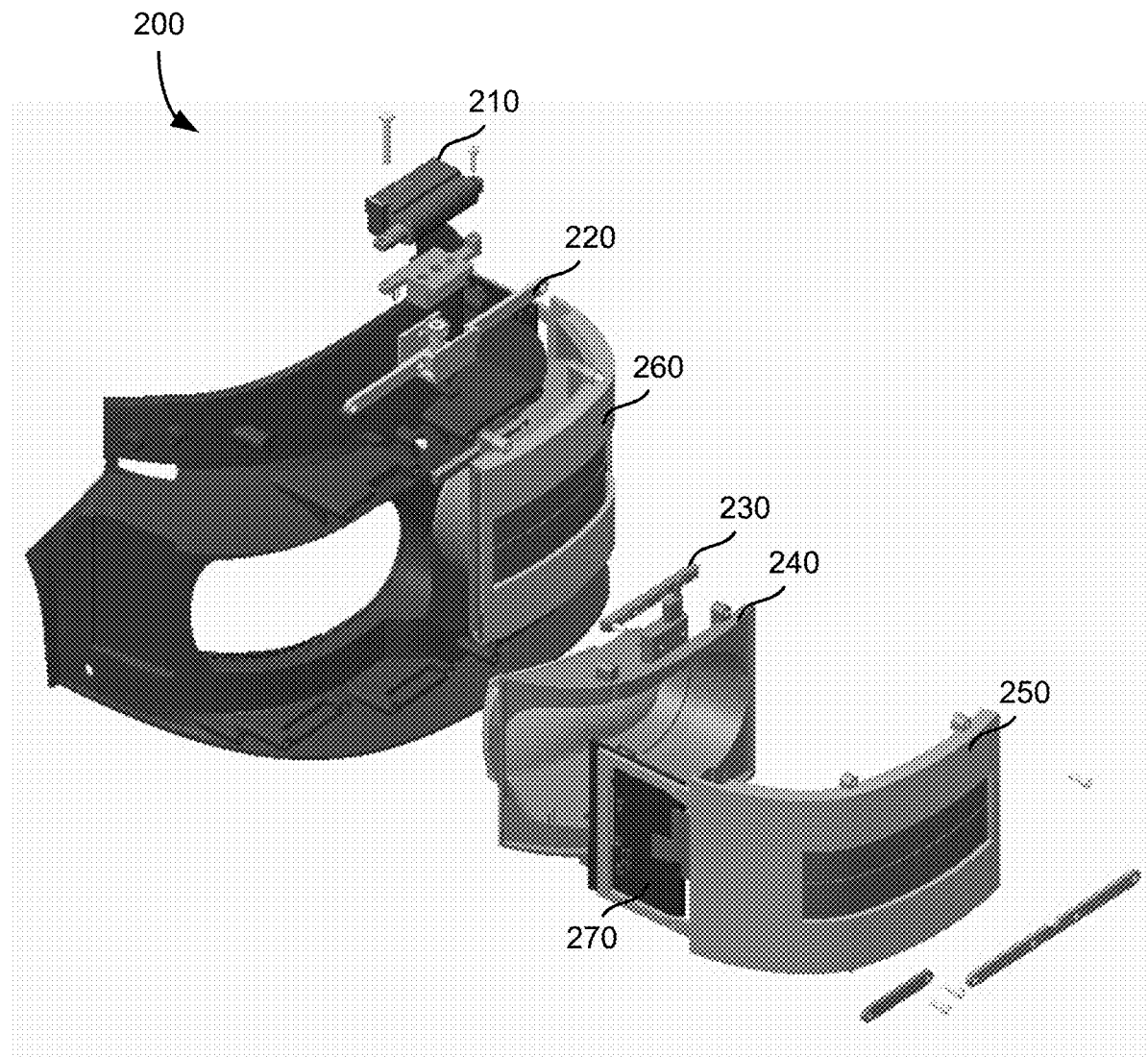
FIG. 2 is an exploded view of a head mount display lens system.

FIG. 2 is an exploded view of a head mount display lens system. The head mount display lens system 200 of FIG. 2 includes motor 210, gear assembly portions 220 and 230, lens mount 240, a first display 250, a second display 260, and circuitry 270.

Motor 210 may receive signals from a remote computing device, for example through a wired or wireless communication interface, and may drive gear assembly portions 220 and 230 to adjust the positions of displays 250 and 260. The motor and gear assembly portions may move the lens mounts towards each other and away from each other. Put another way, the motor and gear assembly may move the lens mounts towards the center of the user's face and away from the center of the user's face. The motor may include a linear actuator that drives rack and pinion gear elements which implement gear assembly portions 220 and 230. Motor 210 may also include a positional encoder that tracks the current position of the gear assembly and may provide position information to the remote computing device. In some instances, the motor and gear assembly portions may move the first lens mount and second lens mount 6 to 10 mm apart from each other or together in a position in which the mounts are in contact with each other. Circuitry 270 may include circuitry for driving a display, processing images on a display, and other functionality.

Figure 3:
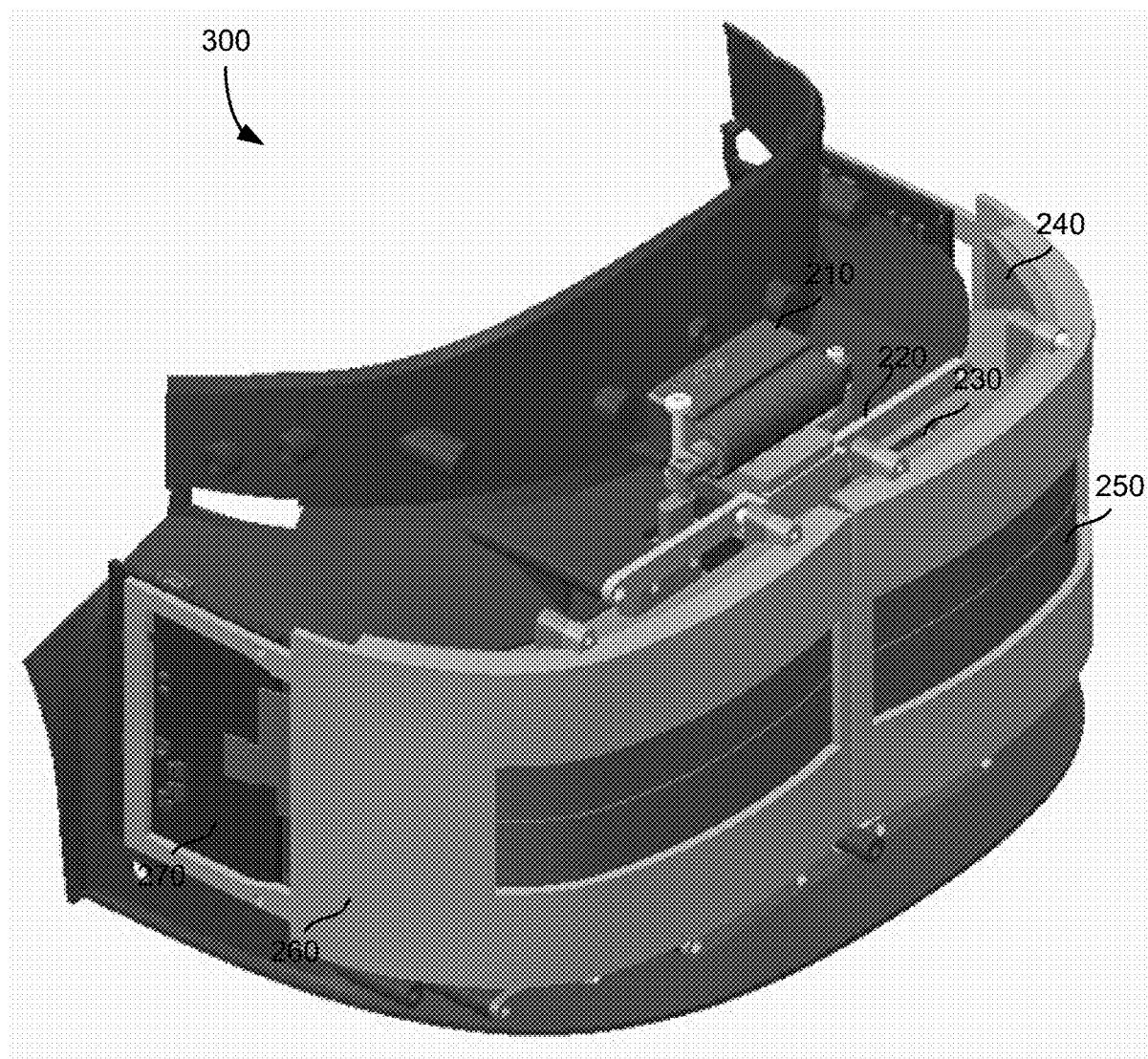
FIG. 3 is another view of a head mount display lens system.

FIG. 3 is a view of a head mount display lens system. FIG. 3 illustrates the head mount display lens assembly of FIG. 2 when completely assembled. The mount display system 300 of FIG. 3 includes motor 210, gear assembly portions 220 and 230, lens mounts 240, right display 250, left display 260, and circuitry 270. The head mount display portion may fit within a helmet or unit that fits over the head of the user.

Figure 4:
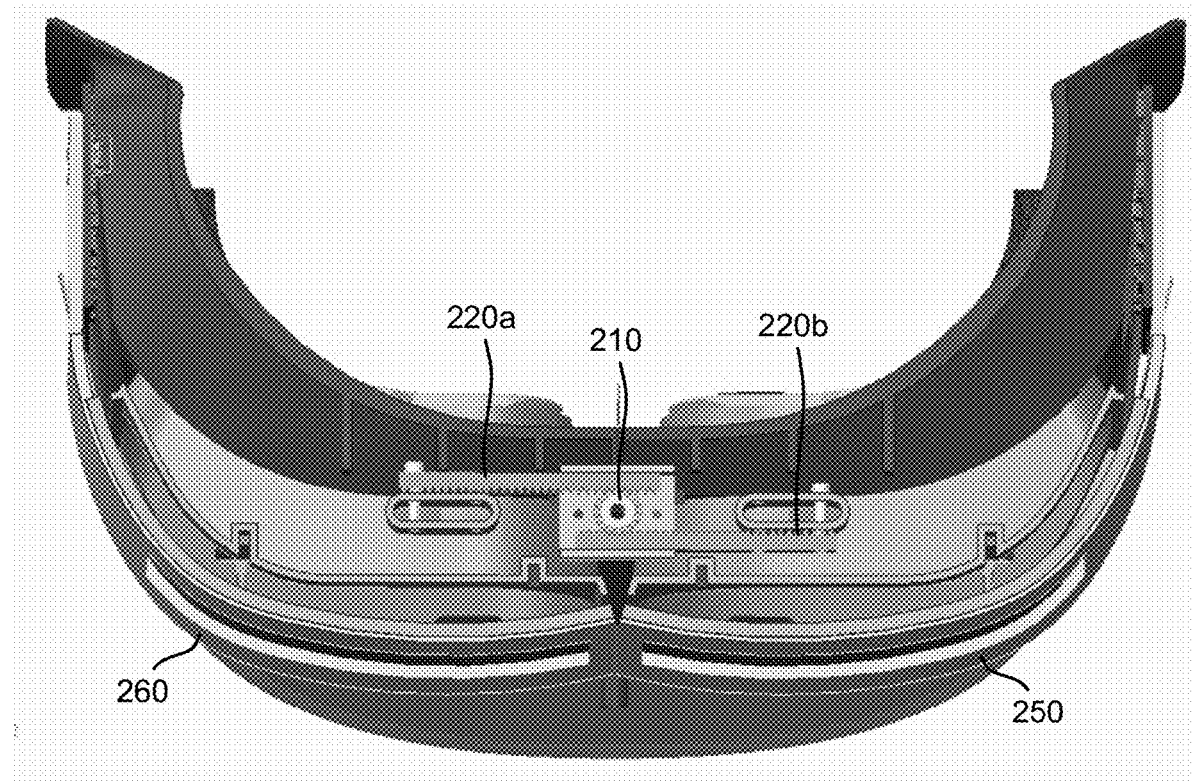
FIG. 4 is a top view of a head mount display system with a minimum distance between the head mount display lenses.

FIG. 4 is a top view of a head mount display system with a minimum distance between the head mount display lenses. As shown in FIG. 4, rack portion 220A for the right lens mount and rack 220B for the left lens mount may be engaged by pinion gear, and pinion gear may be engaged by a motor 210. The lens assembly of FIG. 4 shows first lens 260 and second lens 250 in contact with each other. This position corresponds to the minimum inter-lens distance, which may be configured for lower values of user IPD.

Figure 5:
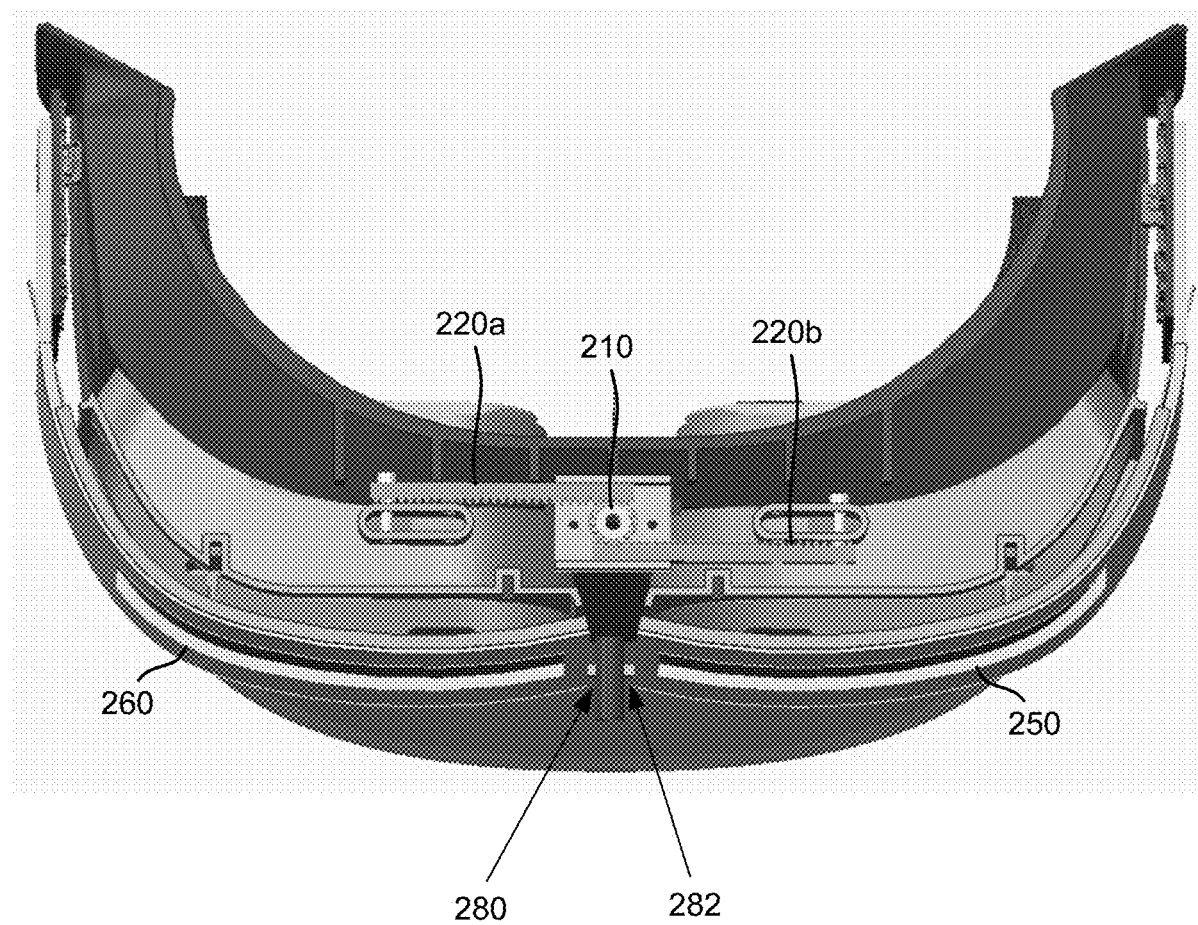
FIG. 5 is a top view of a head mount display system with an increased distance head mount display lenses.

FIG. 5 is a top view of a head mount display system with an increased distance head mount display lenses. Lens assembly of FIG. 5 shows rack 220A and rack 220B extended away from pinion gear and motor 210. The extended racks result in displacing the lens mounts away from the motor and center of the lens display assembly, creating gaps 280 and 282 between the lens elements in the lens assembly. The extended lens mounts result in a wider inter-lens distance (corresponding to a larger IPD for user).

Figure 6:
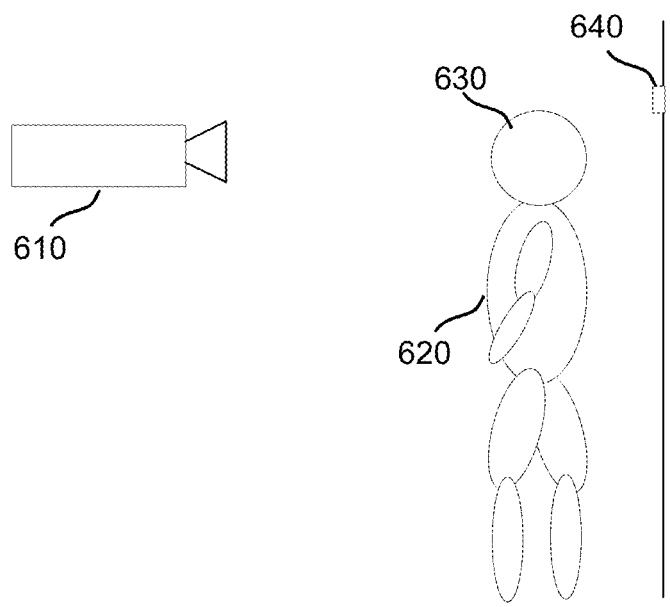
FIG. 6 illustrates an environment for capturing an image of the user's pupil and distance scaling information.

To determine a user's IPD, the distance between the user's pupils must be measured. FIG. 6 illustrates an environment for capturing an image of the user's pupil and distance scaling information. The environment of FIG. 6 includes a camera 610, user 620, and a distance scale 640. The camera 610 may capture an image of the user's head 630 with the distance scale 640 in the background. In some instances, the user may be positioned a certain distance away from the camera at which a certain distance scale within the resulting image will be predetermined. For example, when the user is positioned at a certain position, it may be predetermined that 150 pixels equals 2 millimeters. The distance scale may indicate a scaled distance. For example, the distance scale may include 40 vertical lines, and it may be known that each pair of adjacent vertical lines is 2 millimeters apart. If, in an image taken by the camera, the center of the user pupils are separated by 30 vertical lines, that user's IPD will be 60 millimeters.

The IPD may be most accurate when the user's pupils are focused at infinity, such that both eyes are centered. As such, though not shown in FIG. 6, a focus target may be provided to ensure a user focus's on something far away, causing the user pupils to be centered when a picture of the user is captured.

Figure 7:
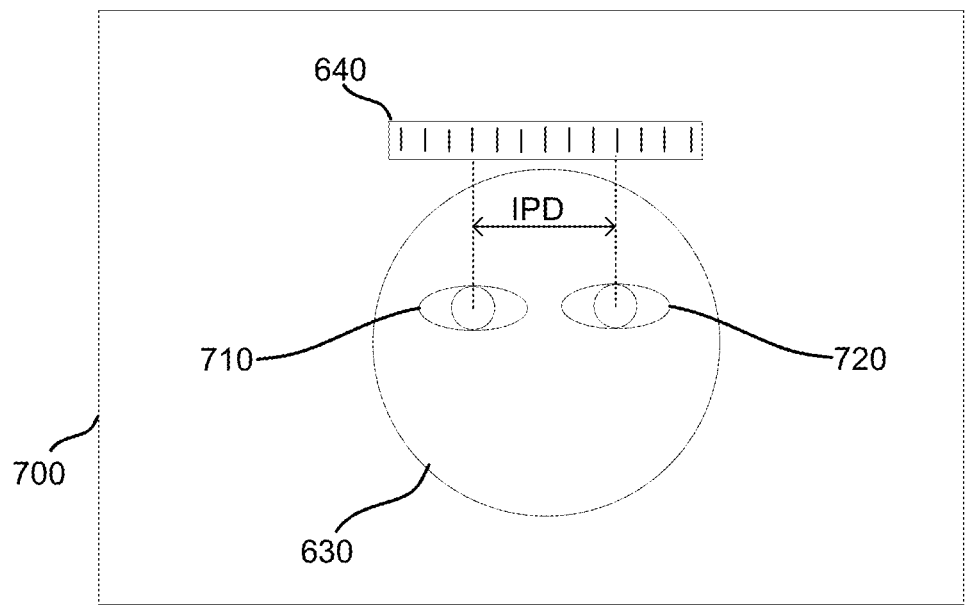
FIG. 7 illustrates an image from which the distance between a user's pupils be determined.

FIG. 7 illustrates an exemplary image 700 taken from camera 610 of the environment of FIG. 6. The image 700 illustrates the user's face as well as the distance scale 640. Image processing techniques can be used to identify the pupils of the user's eyes within the image and identify a relative distance between the two pupils based on the distance scale 640.

In some instances, the distance may be calculated using this distance scale 640, in that the distance within the image can be converted to actual distance based on the distance between the pupils in terms of the distance scale. Once the distance is known, the IPD can be determined and any adjustments to the head mount display lens assembly can be automatically implemented.

Figure 8:
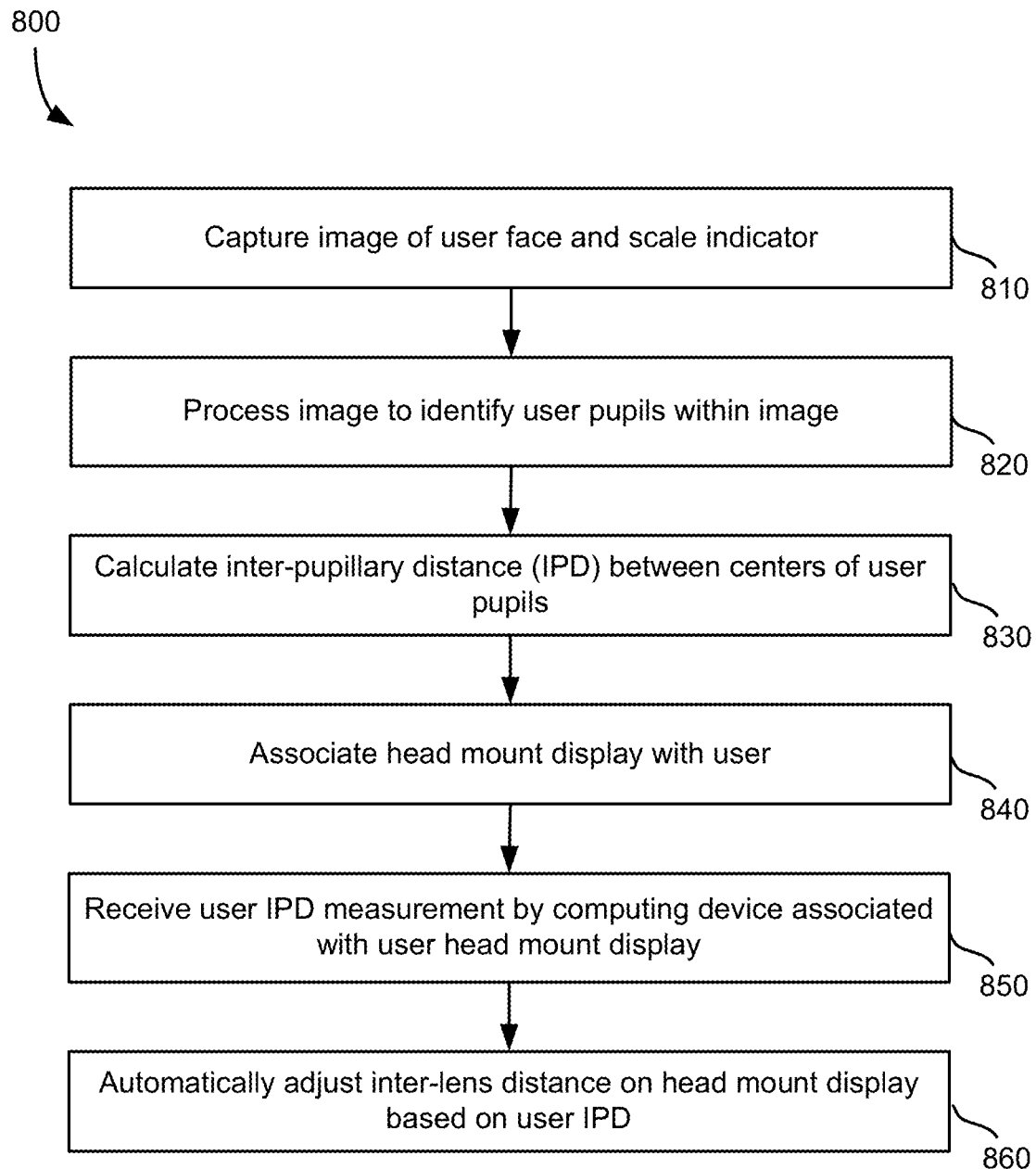
FIG. 8 is a method for configuring a head mount display for user.

FIG. 8 is a method for configuring a head mount display for user. An image is captured of a user's face and scale indicator at step 810. The image may be processed to identify the user's pupils within the image at step 820. Image processing techniques for recognizing a user's eye are known in the art and may be implemented as part of the present technology. Once a user's eyes are recognized, the center of the eyes may be identified as the location of the pupil. In some instances, the actual pupil may be identified as part of the image processing applied to the image of the user.

Once pupils are identified, the inter-pupillary distance or "IPD" is calculated between the centers of the user's pupils at step 830. The distance may be in inches, centimeters, or some other unit. The distance within the image may be based on the distance scale, a known position of the user, a known position of the camera, and a known position of the distance scale. The IPD for the user may be stored as part of a user account.

A head mount display may be associated with the user at step 840. Once a user has entered a stage associated with a virtual reality experience, the user may be fitted with a head mount display. Associating the head mount display with the user may include fitting the user with a particular head mount display and associating the head mount display with the user's account.

The user IPD measurement may be received by a computing device associated with the user head mount display at step 850. In some instances, when a user enters the stage on which the virtual experience is provided, the user will be provided with a computing device on the user's person. For example, the computing device may be contained within a backpack that is worn by the user. The computing device may communicate directly with an interface within the head mount display, such as to retrieve lens position information, drive a motor to adjust lens position information, and other communication. Additional communication may include accessing the user's account and retrieve the IPD from the account.

The inter-lens distance may be automatically be adjusted on the head mount display based on the user IPD at step 860. The computing device may receive the IPD and calculate a corresponding value for the inter-lens distance. Put another way, computing device may receive the IPD and determine how far apart, if at all, the lenses of the head mount display should be separated for the user in order to provide the most enjoyable viewing experience through the lens assembly. In some instances, the inter-lens display separation may be configured such that the center of a first, centermost portion of the front of the lens and the center of the first portion, centermost portion of the second lens is spaced apart by an amount equal to or slightly less than the user IPD. Automatically adjusting an inter-lens systems a son a head mount display based on a user IPD is discussed in more detail to respect to the method of FIG. 9.

Figure 9:
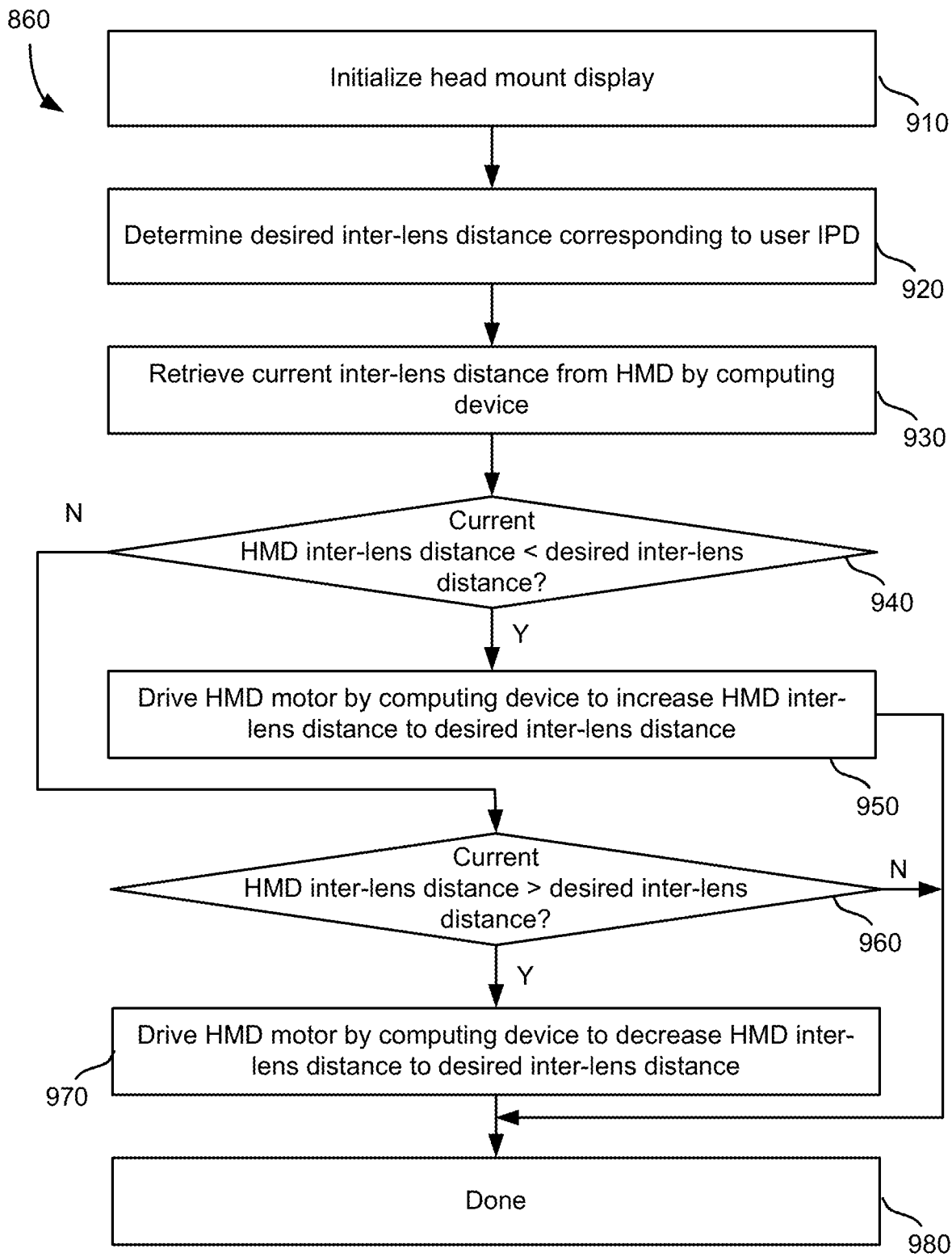
FIG. 9 is a method for automatically adjusting an inter-lens distance on a head mount display based on a user IPD.

FIG. 9 is a method for automatically adjusting an inter-lens distance on a head mount display based on a user IPD. The method of FIG. 9 provides more detail for step 860 of the method of FIG. 8. A head mount display is initialized at step 910. Initializing the head display may include powering up the display and connecting the head display in communication with a computing device associated with the user. A desired inter-lens distance that corresponds to the user IPD is determined at step 920. In some instances, each lens within a lens assembly should be positioned such that the user's pupils are directly centered with respect to the lens in front of the pupil. In some instances, the pupil may be positioned within a particular positional range in front of each particular lens. The inter-lens distance is configured such that the center of each lens is the same as or a factor of the IPD for the user.

The current inter-lens distance is retrieved from the HMD by the computing device at step 930. A positional decoder may track the current position of the lens in one display and provide that position information to the computing device.

A determination is made as to whether the current HMD inter-lens distance is less than the desired inter-lens distance at step 940. If the current distance is less than the desired distance at step 940, the HMD motor is driven by the computing device to increase the HMD inter-lens distance to the desired inter-lens distance at step 950. Upon achieving the desired inter-lens systems, the method of FIG. 9 ends at step 980. If the current distance is not less than the desired distance, a determination is made at step 960 as to whether the HMD inter-lens distance is greater than the desired inter-lens systems. If the current distance is greater than the desired distance at step 960, the computing device drives the motor to decrease the HMD inter-lens distance to the desired inter-lens distance at step 970. Once the desired inter-lens distance has been achieved at step 970, method and at step 980.

Figure 10:
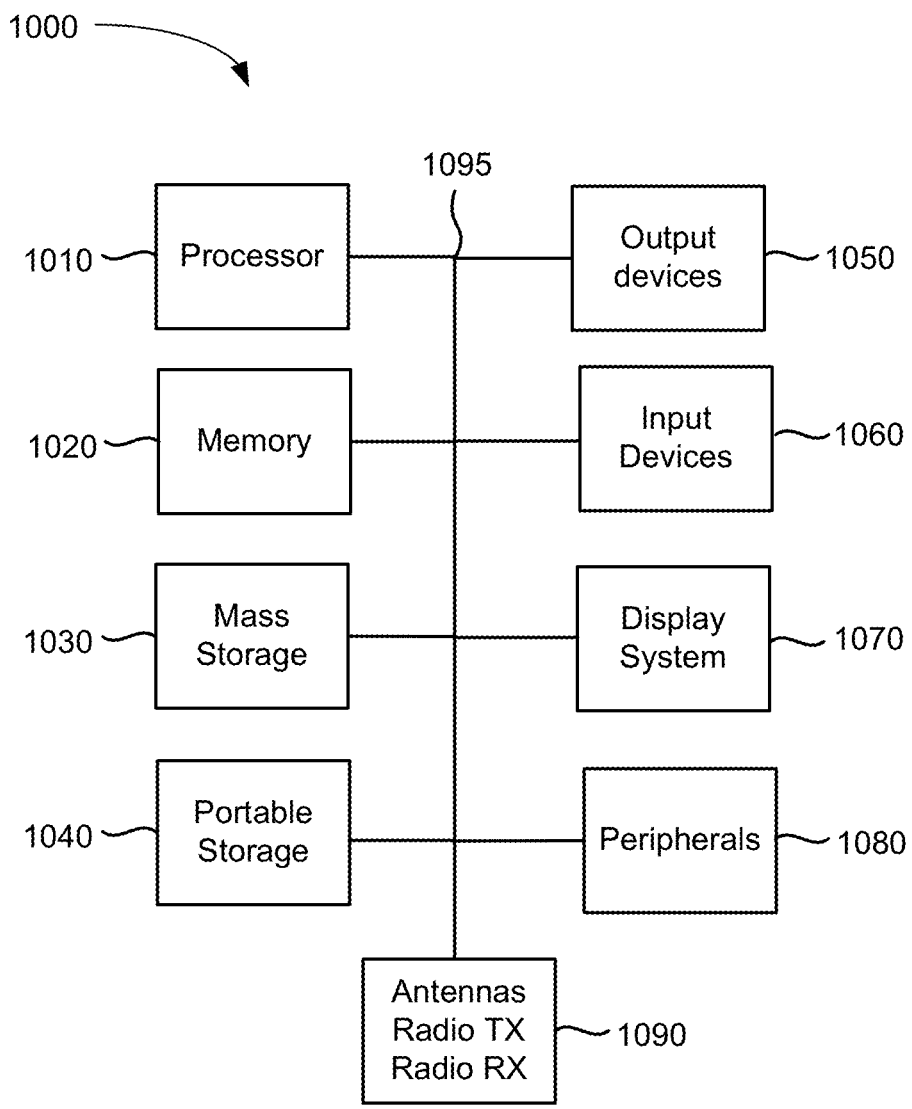
FIG. 10 is a block diagram of a computing environment for use with the present technology.

FIG. 10 is a block diagram of a computing environment for use with the present technology. System 1000 of FIG. 10 may be implemented in the contexts of the likes of player computers 120 and 122, game computer 150, and networking computer 170. The computing system 1000 of FIG. 10 includes one or more processors 1010 and memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive, an optical disk drive, a flash drive, or other device, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a floppy disk, compact disk or Digital video disc, USB drive, memory card or stick, or other portable or removable memory, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device. Display system 1070 may also receive input as a touch-screen.

Peripherals 1080 may include any type of computer support device to add additional functionality to the computer system. For example, peripheral device(s) 1080 may include a modem or a router, printer, and other device.

The system of 1000 may also include, in some implementations, antennas, radio transmitters and radio receivers 1090. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A head mount display that provides visual content as part of a virtual reality experience for a user and that automatically adjusts an inter-lens distance for the user based on a measured inter-pupillary distance of the user, the head mount display including:
    a first display and a second display;
    a first display mount connected to the first display;
    a second display mount connected to the second display;
    a gear assembly coupled to the first display mount and to the second display mount;
    a motor coupled to the gear assembly, the motor able to engage the gear assembly to move the first display mount and second display mount closer together or to move the first display mount and the second display mount further apart based on a desired inter-lens distance determined based on the measured inter-pupillary distance of the user; and
    a communication interface coupled to the motor, the communication interface able to receive one or more signals from a remote computing device that drive the motor, the one or more signals causing the motor to adjust the first display mount and the second display mount to the desired inter-lens distance.

2. The head mount display of claim 1, the remote computing device providing a signal to drive the motor in a first direction to bring the first display mount and the second display mount together or a second direction to move the first display mount and the second display mount apart.

3. The head mount display of claim 2, the remote computing device driving the motor to adjust the first display mount and the second display mount to achieve the desired inter-lens display distance.

4. The head mount display of claim 2, wherein the remote computing device determines a desired inter-lens distance based on the measured inter-pupillary distance of the user, and wherein the remote computing device further provides the one or more signals that drive the motor to adjust a current inter-lens distance of the head mount display to match the desired inter-lens distance.

5. The head mount display of claim 4, wherein the remote computing device retrieves a current inter-lens distance from the head mount display.

6. The head mount display of claim 1, wherein the motor includes a linear actuator.

7. The head mount display of claim 1, wherein the head mount display includes a positional decoder.

8. A method performed by a computing device for adjusting an inter-lens distance of a remote head mount display that provides visual content as part of a virtual reality experience for a user, the method including:
identifying, by the computing device, an inter-pupillary distance for the user, the computing device in communication with the remote head mount display worn by the user for use in a virtual reality environment;
determining a desired inter-lens distance based on the inter-pupillary distance for the user;
identifying a current inter-lens distance in the remote head mount display; and
sending one or more signals to the remote head mount display, the one or more signals driving a motor in the remote head mount display to adjust a position of each of two display mounts based on the desired inter-lens distance and the current inter-lens distance.

9. The method of claim 8, further comprising:
capturing an image of the user's face and a distance scale;
processing the image to determine a relative distance between the user's pupils; and
calculating an actual distance between the user's pupils based on the relative distance and the distance scale.

10. The method of claim 8, wherein the one or more signals cause the remote head mount display to drive the motor in a direction that increases the inter-lens distance.

11. The method of claim 8, wherein the one or more signals cause the remote head mount display to drive the motor in a direction that decreases the inter-lens distance.

12. The method of claim 8, wherein the computing device is contained within a carrying mechanism on the user's body.

13. The method of claim 8, wherein identifying the current inter-lens distance is provided by a positional encoder within the head mount display.

14. The method of claim 8, further including storing the inter-pupillary distance for the user in association with a user account.

* * * * *